United States Patent [19]

Gramling et al.

[11] Patent Number: 5,524,723
[45] Date of Patent: Jun. 11, 1996

[54] ARRANGEMENT FOR INDUCTIVE GUIDANCE OF NON-TRACK-BOND VEHICLES

[75] Inventors: Hubert Gramling, Ebersbach; Klaus Diesner, Weissach; Wolfgang Darenberg, Fellbach; Ronald Heuthe, Reutlingen, all of Germany

[73] Assignee: Daimler Benz AG, Germany

[21] Appl. No.: 206,931

[22] Filed: Mar. 7, 1994

[30] Foreign Application Priority Data

Mar. 6, 1993 [DE] Germany .......................... 43 07 141.4

[51] Int. Cl.⁶ ..................................................... B60T 7/16
[52] U.S. Cl. ............................ 180/168; 191/10; 104/286
[58] Field of Search .................... 180/168, 167; 191/10; 104/284, 286, 294; 318/587; 364/424.02

[56] References Cited

U.S. PATENT DOCUMENTS

| | | | |
|---|---|---|---|
| 3,947,741 | 3/1976 | Ball et al. | 318/588 |
| 3,993,156 | 11/1976 | Rubel | 180/168 |
| 4,006,790 | 2/1977 | Kawano et al. | 180/168 |
| 4,258,813 | 3/1981 | Rubel | 180/168 |
| 4,714,124 | 12/1987 | Laib | 180/168 |
| 5,434,781 | 7/1995 | Alofs et al. | 180/168 |

FOREIGN PATENT DOCUMENTS

| | | |
|---|---|---|
| 289868 | 11/1988 | European Pat. Off. ............... 191/10 |
| 0384841 | 8/1990 | European Pat. Off. . |
| 2500792C2 | 7/1975 | Germany . |
| 2445001 | 4/1976 | Germany . |
| 2502405 | 7/1976 | Germany . |
| 2608008 | 9/1977 | Germany . |
| 3916610 | 12/1989 | Germany . |
| 380541 | 8/1961 | Switzerland . |
| 999045 | 7/1965 | United Kingdom . |

OTHER PUBLICATIONS

French Search Report dated Jun. 9, 1995.
Communication from German Patent Office dated 17 Nov. 1995.

Primary Examiner—Christopher P. Ellis
Attorney, Agent, or Firm—Evenson, McKeown, Edwards & Lenahan

[57] ABSTRACT

An inductive guidance arrangement for non-track-bound vehicles on a vehicle supporting surface. Guidance conductors laid alongside the supporting surface carry an alternating current which generates an alternating magnetic field. The actual transverse position of the vehicle relative to the alternating magnetic field is continuously detected by aerial crossed coils arranged on the vehicle at a defined distance above the supporting surface. A controller and steering apparatus arranged on the vehicle detect the actual transverse position of the vehicle relative to a desired position, and generate a steering instruction, which eliminates transversal positional deviation. The guidance conductors are arranged parallel to one another at the same vertical position, with a mutual transverse spacing of approximately 50% of the vertical height of the aerial crossed coils above the supporting surface. The transverse spacing of the guidance conductors corresponds to an integral multiple of (preferably twice) the transverse spacing of the metal reinforcement elements contained in the supporting surface.

12 Claims, 2 Drawing Sheets

ARRANGEMENT FOR INDUCTIVE GUIDANCE OF NON-TRACK-BOND VEHICLES

BACKGROUND AND SUMMARY OF THE INVENTION

The present invention is directed to an arrangement for inductive guidance of non-track-bound vehicles in which a guiding conductor laid alongside a vehicle supporting surface is energized by an alternating current to generate a guiding magnetic field.

A recurrent problem with such systems is that the course of the guidance-determining alternating magnetic field is distorted in an uncontrolled fashion by concrete reinforcing steel which is integrated into the supporting surface, and the vehicle is guided in accordance with this "rolling course", which (at least at speeds above approximately 30 km/h) becomes increasingly troublesome with increasing speed, and is intolerable in the region of 80 km/h. German patent document No. DE 24 45 001 C2 discloses an arrangement for dealing with this problem in which two aerial crossed coils are provided vertically one above the other at a distance on the vehicle, and the actual position of the vehicle is determined in relation to the alternating magnetic field in each case independently using the two aerial signals. If the two events have different results, the difference can only be due to a locally interference-determined asymmetry of the alternating magnetic field. The actual transverse position of the vehicle in relation to the guidance-determining conductor can also be concluded from the difference between the results. When faults of the alternating magnetic field are detected, the actual position of the vehicle determined in this manner is further processed by an alternate method for the guidance of the vehicle.

A disadvantage of this arrangement is that during the evaluation of the two different aerial signals the differential value of two intermediate results is further processed, both intermediate results each being subject to a specific degree of measuring uncertainty. Although the absolute value of the difference between the two is extremely small, on the other hand the uncertainties may be added, so that the ratio between the reliable useful amount and the unreliable portion of the measuring result is extremely small. In addition, the relatively high vehicle-side expenditure can become very considerable in the case of a relatively large pool of guidable vehicles. Also, in some existing systems in which the problem of magnetic field interference has not occurred hitherto, (for example, because of the use of asphalt supporting surfaces or because concrete reinforcing steel lies deep below the surface of concrete supporting surfaces), the problem can arise subsequently because of extensions to the route network necessitating a retrofit of all the vehicles of the pool, which is expensive.

German patent document DE 25 00 792 C2 discloses a multi-conductor system for driverless transport systems, in which vehicles are guided inductively along an alternating magnetic field on the side of the supporting surface. Transport systems of this kind are used, for example, in production lines for the automation of the material flow; their vehicles travel at most at a walking pace, (that is to say very slowly in comparison with vehicles for roadworthy passenger or goods traffic). Magnetic field distortions at such low travel speeds do not cause any interference and the problem of balancing such magnetic field distortions does not arise.

In the previously known multi-conductor system, the individual conductors are arranged at a very small distance apart and can be represented, for example, by a two-conductor flat-ribbon radio aerial cable. The conductors of the conductor pair may be arranged either horizontally (one next to the other) or else vertically (one above the other). The known multiple arrangement of floor conductors is provided in order to guide the vehicles safely through route branches and junctions, without costly special arrangements of additional conductors in these regions and without having to connect or disconnect relatively long, impedance-varying branches of guiding conductors. The two conductors do not extend parallel to one another in the region of the branching, but divide in accordance with the desired course over the dividing routes; subsequently in each case one individual conductor which comes from elsewhere "joints" with the conductor which leads on individually to form a new conductor pair which then follows the desired course of the new route. The conductors are arranged in a network of routes provided with route branches and junctions, in such a way that crossing over of the conductors does not occur, and a single continuous conductor passes through all the routes in the entire network twice—even if on different paths.

There are no crossed coils arranged as aerials on the associated previously known vehicles. Rather, three vertically aligned aerial coils located one next to the other. Of these, only two adjacent coils are active at the same time: that is, the central coil and the right-hand one, or the central coil and the left-hand one. The two active coils together essentially sense the alternating magnetic field of only a single conductor of the conductor pair. Therefore, in each case only one of the two conductors or only one of the two magnetic fields is effective as a guiding field. Only in the case of a desired route change at a branch does the system change to the other conductor, by switching over to another pair of aerial coils, and from this time onwards this other conductor and the alternating magnetic field surrounding are used to guide the vehicle. Because of the distance between the supporting surface conductors is small the path of the conductors is not continuously parallel, and due to the different design and arrangement of the vehicle-side aerial coils, no improvement in any magnetic field distortions in the previously known system arising from interference is to be expected, especially since magnetic field distortions of this kind are in any case not a problem.

German patent document DE 25 02 405 A1 describes another inductive vehicle guiding system for non-track-bound vehicles, in particular tractors, which are provided with steerable wheels. Specifically, this publication addresses the problem of providing automatic guidance when cultivating fields, with a capability for easily changing the position of the working set course by a desired amount. For this purpose, at least two parallel guide cables, with an alternating current flowing through them always in the same direction, are laid in or under the surface plane (that is, the field to be worked), preferably along the field on both sides. The transverse spacing between the two guide cables is always an order of magnitude larger than the width of the vehicle. The guide cables are fed by a generator at one end and grounded at the other end. (Alternatively, a common return line can also be used.) Arranged on the vehicle side are aerial coils and an amplifier connected downstream, which permit the measurement of the magnitude and individual components of the magnetic fields originating from the guide cables. The height of the aerial coils above the supporting surface is negligible compared with the very large transverse distance between the guide cables, so that the strength of the magnetic field is measured virtually in the same plane as the guide cables; that is between the guide cables. In this arrangement, the aerial coils occupy a different position relative to the guide cables, namely to the left of one guide cable and to the right of the other guide cable, and opposite vertical components of the magnetic fields are detected along a set course. By means of an appropriate course correction which is induced in the vehicle, the opposite measurement signals are nulled, and the vehicle is thus kept on the set course. By preselection of a ratio of the current strength or of the frequency in the two guide cables, the position of the set course in relation to the guide cables can be varied infinitely. By means of the vehicle-side aerial coils, the geometric location of the vehicle between the guide cables (at which the strength of the two interfering magnetic fields is in each case of identical size) is continuously detected.

According to the foregoing patent document, both the current strength and the frequency can be used to change the magnetic field strength around the guide cables. This publication does not, however, address the problem of magnetic field interference, because this problem does not arise at all when cultivating fields: on the one hand in a field, a meadow or the like which is to be cultivated, there are normally no elements which cause magnetic interference and, on the other hand, any such elements, for example, a forgotten hoe or the like, would interfere with the vehicle course only to a degree which is in any case tolerable. A lateral offset of a few centimeters due to interference would adversely affect neither the working result of the cultivation of the field nor, because of the low working speed, the driving comfort on the tractor.

German patent document DE 26 08 008 A1 describes an inductive vehicle guiding system for boats for leisure parks. In this arrangement, the guidance conductors are laid in a plane underneath the vehicles, for example at the same depth under water. Depending on the number of passengers, the boats are submerged in the water to a greater or lesser depth, and thus, the problem arises that the vertical distance between the aerial coils and the conductors (and hence the strength of the aerial signals) varies. Also, a greater or lesser degree of pollution of the water, in particular by metallic foils, influences the strength of the aerial signals.

In order to compensate for such interference factors which affect signal amplitudes, a total of four guidance conductors are laid in a plane underneath the path of the boat. In each case two conductors are connected at the end of the route to form a conductor loop, and alternating current thus flows through them in opposite directions. The four conductors are therefore laid in pairs in conductor loops which themselves are fed with alternating currents that are offset by 90°. The four conductors therefore have alternating currents flowing through them which have the same frequency, but differ in phase angle by 90°, specifically with the phases 0°, 90°, 180° and 270°. This patent does not give any more detailed information on the transverse position of the individual conductors in relation to the set course of the vehicle; all that can be assumed on the basis of the drawing and the overall context is that the four conductors are to be laid symmetrically with respect to the set course.

In this system, means of the aerial coils which are installed on the boat, it is not the amplitudes of the magnetic field strengths but rather the phase angle which is evaluated for purposes of guiding the boat. Depending on the size and direction of the transverse deviation of the aerial coils from the set position, phase signals of the magnetic field vectors are produced which vary in size and direction. What is important in this case is simply the magnitude of a useful signal, but not the actual representation of the signal for a transverse position error of the vehicle. Since such interference sources are not present, due to the absence of interfering iron particles in the vicinity of the guidance-determining conductors, the problem of magnetic field interference, and of a corresponding interference in the guidance during automatic steering of the boat, does not arise. Moreover, any such interference would have a complete superimposition of normal pitching and following movements of the boat caused by waves; and therefore would not be perceptible at all.

The object of the present invention is to provide an arrangement for inductive guidance of roadworthy non-track-bound vehicles which compensates for local supporting surface interference of the guidance-determining alternating magnetic field, without need of complex vehicle-side measures, particularly multiple arrangements of aerial crossed coils and special evaluation channels for each of the aerial signals for the equalization or compensation of the influence of the magnetic field interference.

This object is achieved according to the invention in an arrangement of the generic type described heretofore for inductive guidance of non-track-bound vehicles, by an arrangement of the guidance conductors which minimizes local interference generated by reinforcement elements in the supporting surface without requiring additional circuits or detection coils. With a multiple arrangement of conductors, the alternating magnetic field decreases more rapidly as the distance from the conductor increases than is the case for a single-conductor system; but the interference of the magnetic field in the case of the multi-conductor system also decreases correspondingly more rapidly than is the case in the single-conductor system. In fact, in the case of a two conductor system interference decreases with the square of the distance of the conductor from the interfering element, while in the case of the three-conductor system it decreases with the cube of the distance, and in the case of the four-conductor system the power of four etc. The alternating magnetic field component (that is, the horizontal or vertical component, depending on the arrangement of the conductors), which is used for guidance, is approximately the same size in the case of a multiple arrangement of conductors under comparable conditions as in the case of a single-conductor system. Thus, interference generated in the supporting surface affects the alternating magnetic field considerably less in the radial direction in the multi-conductor system than is the case in the single-conductor system. In the case of the multi-conductor system, the interference is more localized in an area near to the conductor than is the case in the single-conductor system; and hence, despite any supporting surface generated magnetic field interference, virtually an undisturbed alternating magnetic field with an uninterrupted path is present at the vehicle aerial crossed coils.

The preferably two conductors should have a certain minimum spacing, but must however not be too far away from one another. If the mutual spacing of the conductors is too small, differences in level between the conductors have perceptible influences even on the transverse position of the alternating magnetic field; in addition, the useful field strength drops under otherwise comparable conditions with diminishing transverse spacing of the conductors. If the transverse spacing of the conductors is too great (for example significantly greater than the vertical spacing between the aerial crossed coils and the supporting surface), the slope of the characteristic line for transverse deviations of the vehicle from its desired position on the supporting surface is too small. With the stated relative transverse spacing of the conductors of approximately 50 to 100% of the height of the aerial crossed coils above the supporting surface, both the useful field strength and the ratio of interference field strength to the slope of the characteristic line are near to the theoretical, but virtually unattainable, optimum values.

Other objects, advantages and novel features of the present invention will become apparent from the following detailed description of the invention when considered in conjunction with the accompanying drawings.

DETAILED DESCRIPTION OF THE DRAWINGS

Figure 1:
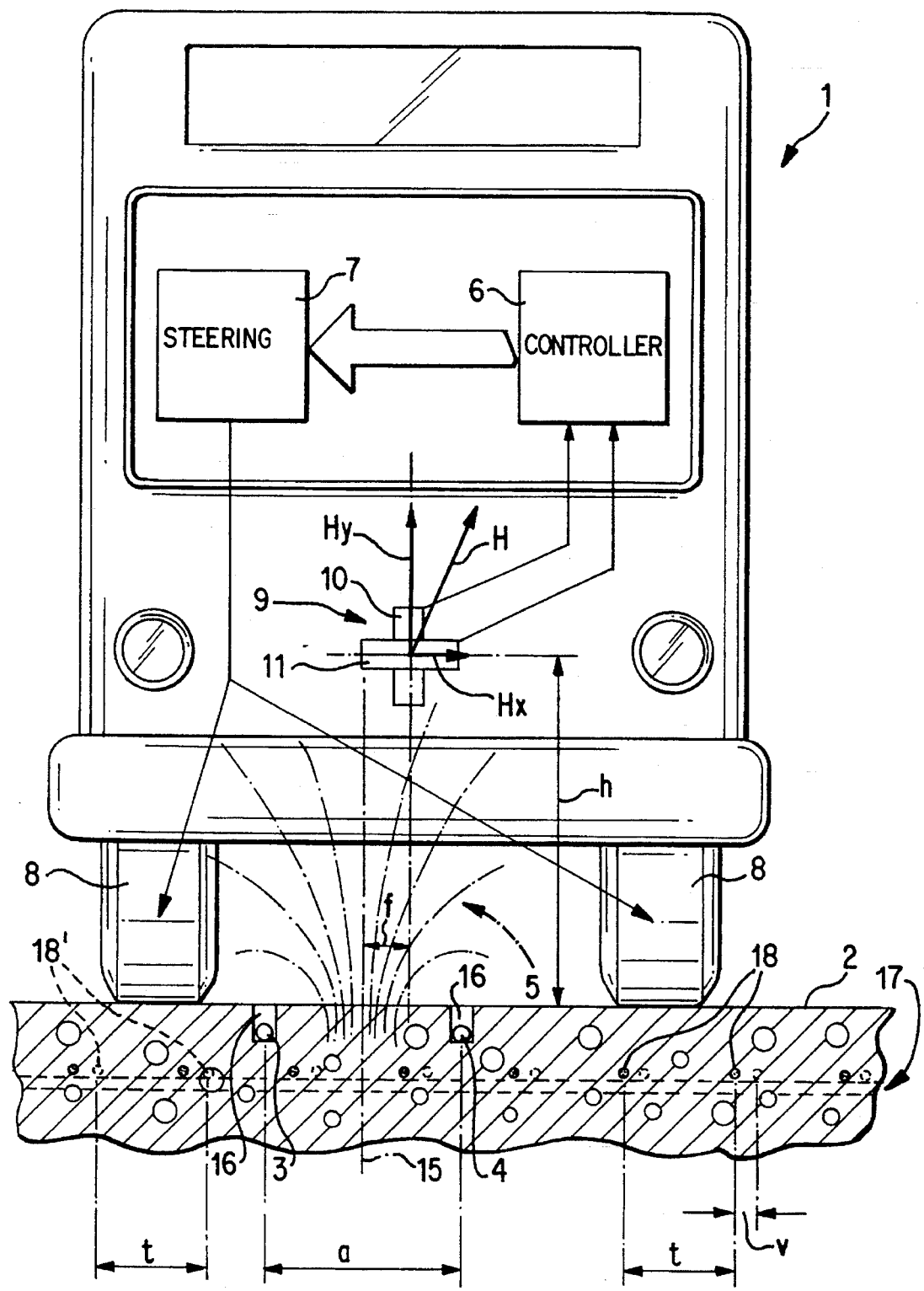
FIG. 1 is a schematic depiction of a guidable vehicle on an supporting surface with two conductors which form a guiding alternating magnetic field according to the invention.
Figure 2:
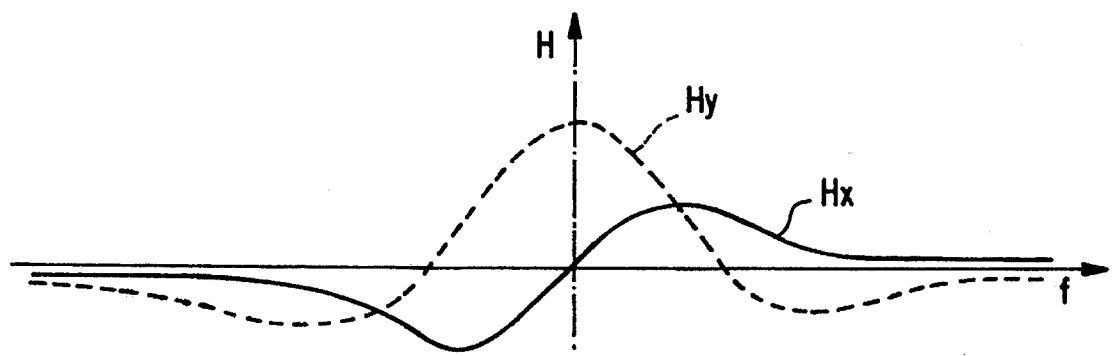
FIG. 2 is a graphic representation of the horizontal portion and the vertical portion of the alternating magnetic field beyond the lateral extent of the supporting surface according to FIG. 1.

In the embodiment illustrated in FIG. 1, a vehicle 1 is provided with an inductive guidance facility and can travel on a supporting surface 2 guided by two conductors 3 and 4. The vehicle 1 has, as usual, steerable vehicle wheels 8 which can be steered manually via a manual steering wheel (not shown). In the guided mode, an automatic guidance device assumes the steering of the vehicle. For this purpose, conductors 3 and 4 have flowing through them an oppositely phased alternating current having a frequency of approximately 10 kHz, thus forming a corresponding alternating magnetic field 5. On the vehicle, this alternating magnetic field is detected by an aerial crossed coil 9, with one vertically aligned coil 10 and one horizontally aligned coil 11. The crossed coil 9 is arranged in the vehicle at a distance h above the supporting surface. The vertical magnetic field component $H_y$ is measured by the coil 10 and the horizontal component $H_x$ of the alternating magnetic field 5 is measured by the coil 11. In the embodiment illustrated, the conductor pair 3 and 4 is arranged symmetrically with respect to the center 15 of the supporting surface and the crossed coil 9 is arranged in the center of the vehicle. With a lateral displacement of the vehicle 1 with respect to the center 15 of the supporting surface (transverse position error f) the horizontal coil 11 measures the horizontal component $H_x$ of the alternating magnetic field, shown by an unbroken line in FIG. 2 By forming a ratio of the measured signals of the two individual coils 10 and 11 (with the horizontal component $H_x$ in the numerator and the vertical component $H_y$ in the denominator), in the exemplary embodiment illustrated in FIG. 1 a signal can be derived whose size and direction represents a desired value/actual value deviation of the transverse position of the vehicle from the center of the supporting surface. Based on this desired value/actual value deviation, it is possible to drive the controller 6 which acts on the steering system 7 of the vehicle to turn the vehicle wheels 8 in such a direction that the desired value/actual value deviation of the transverse position of the vehicle is eliminated, and the vehicle is steered back exactly into the center 15 of the supporting surface.

The principle of inductive guidance of road-worthy vehicles is—at least in the case of a single-conductor system—known, but is susceptible to magnetic field interference induced by metal reinforcement elements integrated in the supporting surface, as well as by metal elements resting on the supporting surface.

The supporting surface 2 is formed from reinforced concrete, reinforcement mats with reinforcement rods or wires which cross over one another being embedded in the concrete underneath the supporting surface. The reinforcement mats are arranged in the supporting surface in such a way that a group of metal reinforcement elements 18 and 18' lies parallel to the longitudinal direction of the supporting surface. As a result of production processes and also in order to compensate for temperature-induced expansions, the supporting surface is constructed in segments which can be individually joined to one another, with transverse expansion joints arranged at regular intervals, so that the metal reinforcement is also interrupted. The reinforcement mats which are assigned to the individual segments of the supporting surface can have at the joints a relative transverse offset (distance v) from the longitudinally extending metal reinforcement element 18 of one segment to the metal reinforcement element 18' of the adjacent segment. As stated, interference with respect to a true course of the alternating magnetic field 5 originates from the reinforcements and also from the joints.

In order to eliminate the damaging influence of fixed interference which is induced in the supporting surface, or to reduce it to a tolerable level, in the exemplary embodiment of the invention illustrated in FIG. 1, two conductors 3 and 4 are laid into the supporting surface at the same level, one next to the other, with a transverse spacing a of 5 to 200% (preferably within a range of approximately 50 to 100%) of the vertical height h of the aerial crossed coil 9. The two conductors 3 and 4 which lie adjacent to one another have an oppositely phased alternating current flowing through them, and the crossed coil 9 arranged above the center between the two conductors is aligned with the alternating magnetic field in the manner already described.

A maximum possible useful field strength on the one hand, and a favorable ratio of interference field strength to steepness of the characteristic line on the other, are decisive for the present purpose. Since the vertical spacing h of the crossed coil 9 above the supporting surface in relatively large vehicles amounts to approximately 40 cm, the transverse spacing of the two conductors 3 and 4 can accordingly be selected within the limits between 20 and 40 cm. Due to the double arrangement of the conductors and a correspondingly formed alternating magnetic field 5, interference of the alternating magnetic field induced in the supporting surface is restricted to an area lying near to the supporting surface and has hardly any effect at the level of the vehicle mounted aerial crossed coil 9.

So as not to bring about a disturbance in the true course of the alternating magnetic field 5 as a result of the transverse offset v of the metal reinforcement elements 18 and 18' in the reinforcement mats 17 of the supporting surface 2, all the conductors (in this case, conductors 3, 4) must always have the same spacing from the metal reinforcement elements 18 and 18' extending in the longitudinal direction of the supporting surface. Under the usual precondition that the reinforcement mats 17 of the supporting surface all extend in the longitudinal direction of the supporting surface with a certain regular transverse spacing t, this requirement can be satisfied by making the transverse spacing a of the guidance-determining conductors equal to an integral multiple (in the illustrated exemplary embodiment twice) of the transverse spacing t of the metal reinforcement elements 18 and 18'. As a result, the total distance of the conductors 3 and 4 from the respective adjacent metal reinforcement element 18 and 18' remains constant, irrespective of the transverse position of the reinforcement mats 17 and the longitudinally extending metal reinforcement elements 18, 18' relative to the center 15 of the supporting surface. Thus, interference of the reinforcement elements 18, 18' with the symmetry of the alternating magnetic field 5 (on which the guidance depends)turns out to be very small; smaller in fact than with all other feasible ways of laying the conductors 3 and 4 (that is, those which can be realized with an acceptable degree of production outlay).

It is important that even in the case of a relatively long supporting concrete surface, the metal reinforcement elements 18, 18' which extend in the longitudinal direction of the supporting surface along the entire longitudinal extent of the guide route have a specific, constant transverse spacing t. (It should be noted in this regard that it is readily possible to allow a particular transverse offset v of the reinforcement mats 17 at transversely extending expansion joints of the supporting surface.) The entire distance along which guidance takes place must therefore be produced using reinforcement mats 17 with uniform transverse spacing t of the longitudinally extending metal reinforcement elements 18, 18'. However, certain minimal deviations between the transverse spacing a of the conductors 3 and 4 on the one hand, and an integral multiple of the transverse spacing t of the metal reinforcement elements 18 and 18', on the other hand, can be tolerated without appreciable adverse effects on the true course of the alternating magnetic field. This deviation should not exceed 20% (preferably 10%) of the spacing t of the reinforcement mats so that the intended effect is adequately achieved. Since the spacing t is frequently 15 cm, the transverse spacing a between the two conductors 3 and 4 should be 30±1.5 cm (that is, between 28.5 and 31.5 cm). Conversely, spacing errors of ±10%, i.e. of ±1.5 cm, can be accepted when laying the conductors with exactly 30 cm and a nominal spacing of the reinforcement mats of 15 cm.

For the purpose of comparison a test was run using the above two conductor system and a single-conductor system, with the respective alternating magnetic fields intentionally falsified by applying a welded wire mesh. Measurement yielded a reduction in the interference, from 15 cm lateral offset for the alternating magnetic field in the case of the single-conductor system, to 2 cm lateral offset in the case of the two-conductor system.

In practical embodiments of a guided route, the conductors will of course be set into a narrow groove 16 which is ground or milled into the supporting surface with a rapidly rotating cutting disc. The fact that in the case of the invention at least two parallel grooves 16 must be milled into the supporting surface, and two conductors 3 and 4 placed therein, constitutes in reality only a very small and readily acceptable additional outlay in comparison with a single-conductor embodiment. Both the milling of the grooves and the laying of the conductors can take place simultaneously for both grooves using a tandem arrangement of grinding discs and cable laying device.

At this point it should be noted that interference with the alternating magnetic field, induced by reinforcement rods or mats, can also be compensated by milling a selectively non-linear path of the grooves. For this purpose, the interference must first be detected locally, quantified and converted into a correction path which can be stored in a data set. The course of the grooves 16 can then be called up for a groove milling machine from this correction data set and the machine can be controlled correspondingly. However, since only relatively large radii of curvature can be milled with such milling machines, only minor interference can be completely compensated in this way. Unfortunately, though, such magnetic field interference frequently occurs very abruptly, with a locally high gradient. In fact, such interference frequently occurs at the joints between segments of the supporting surface, where interruptions or discontinuities in the positioning of metal reinforcement elements occur. Such interference which starts steeply and disappears again rapidly can only be compensated to an acceptable degree using the method according to the invention.

Figure 3:
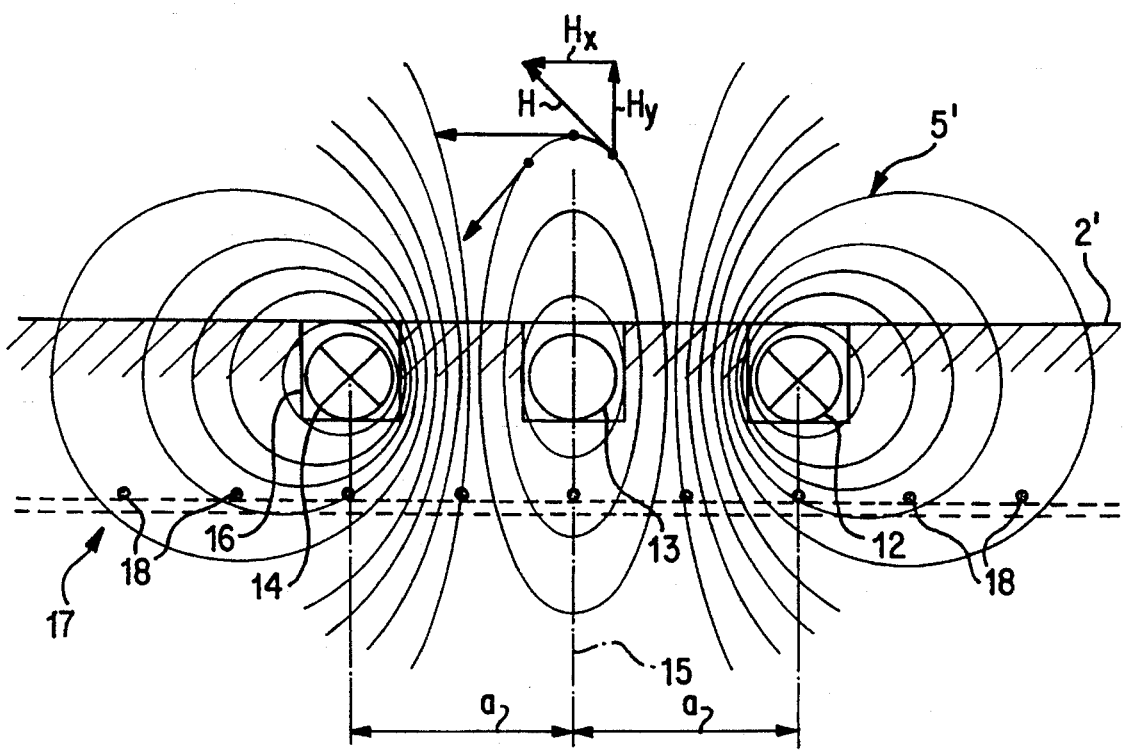
FIG. 3 shows the cross-section through a supporting surface with three guiding conductors.

The illustration according to FIG. 3 shows a possible means of producing a guiding alternating magnetic field 5' with three conductors 12, 13, 14 laid into the supporting surface 2'. In comparison with the two-conductor system illustrated in FIG. 1, this three-conductor system has the advantage that magnetic field interference induced in the supporting surface decays more rapidly with increasing distance from the supporting surface than in the case of the two-conductor system. As in the previous embodiment, conductors which lie adjacent to one another have oppositely phased alternating current flowing through them, with the central conductor 13 having a higher current flowing through it than the two conductors 12 and 14 which lie at the edges. The three conductors 12, 13 and 14 are set into the supporting surface equidistantly, with identical transverse spacing a from one another. The aerial crossed coil which is arranged on the vehicle (not illustrated in FIG. 3) must lie above the central conductor 13 when the vehicle is in the correct transverse position. As can be seen from the illustration in FIG. 3, with this arrangement, the vertical component $H_y$ of the field strength H of the alternating magnetic field 5' becomes zero when the vehicle is in the correct transverse position relative to the center of the supporting surface. In order to accommodate this change, all that is necessary is to interchange the connections of the aerial crossed coil, relative to the arrangement according to FIG. 1, so as to form the ratio $H_y/H_x$, with the vertical component being in the numerator and the horizontal component in the denominator, as a measure of the deviation of the vehicle from the desired position.

The higher outlay of three conductors according to FIG. 3 is justified if the interference induced in the supporting surface is so strong that a two-conductor system cannot reduce it to an acceptable level. In addition, from the higher outlay for three grooves 16 and three conductors 12, 13 and 14 as well as the required cable-laying work, an increased operating outlay in the form of increased current or power requirement is also necessary. For this reason, this increased outlay will only be implemented where it appears absolutely necessary due to strong interference induced in the supporting surface.

For the sake of completeness, it is also noted that four, five or even higher-numbered multi-conductor systems can be made according to the present invention, it being possible for the interference induced in the supporting surface to be compensated with increasing effectiveness as the number of conductors increases. In fact, interference in the case of the three-conductor system decays with the cube of the distance from the conductor; in the case of the four-conductor system, with the power of four; in the case of the five-conductor system, with the power of five, and so on. Of course, both the investment outlay and the outlay for operating coasts is correspondingly higher in the case of the numerous multi-conductor systems.

In multi-conductor systems, the optimum relative distribution of current to the various conductors is shown below (from one outermost conductor to the other):

| | |
|---|---|
| in the case of three conductors as | 1:2:1, |
| in the case of four conductors as | 1:3:3:1, |
| in the case of five conductors as | 1:4:6:4:1, |
| in the case of six conductors as | 1:5:10:10:5:1, |
| in the case of seven conductors as | 1:6:15:20:15:6:1, |
| in the case of eight conductors as | 1:7:21:35:35:21:7:1 or |
| in the case of nine conductors as | 1:8:28:56:70:56:28:8:1. |

It is to be noted that the ratio numbers set forth above correspond to the binomial coefficients of Pascal's socalled triangle of numbers. Under the stated conditions of distribution of currents to the individual conductors, even in the case of numerous multi-conductor systems, the individual conductors are arranged equidistantly next to one another. Furthermore, conductors which lie adjacent to one another must have oppositely phased alternating current flowing through them. In the case of even-numbered multiconductor systems, the vehicle mounted crossed coil is arranged according to the example in FIG. 1 and is aligned with respect to the alternating magnetic field, whereas in the case of odd-numbered multi-conductor systems the crossed coil is arranged and connected in the same way as was described in conjunction with FIG. 3. In view of the very good "cleaning" effect which can be obtained with a three conductor guidance system, multi-conductor systems with higher numbers appear to be of a rather theoretical type.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Inductive guidance arrangement for controlling steering of roadworthy non-track-bound vehicles with steerable vehicle wheels, said guidance arrangement being of the type having at least one guidance conductor installed adjacent a vehicle supporting surface and carrying an alternating current which generates an alternating magnetic field; aerial crossed coils installed in said vehicle at a predetermined vertical height above said supporting surface, which coils continuously detect horizontal and vertical components of said alternating magnetic field to determine actual position of the vehicle in a transverse direction relative to said alternating magnetic field; and means arranged on said vehicle for converting a detected deviation of a transverse position of the vehicle relative to the alternating field on the supporting surface into a steering instruction, thereby moving said vehicle in a direction which eliminates the transverse positional deviation, wherein:

said at least one guidance conductor comprises a plurality of continuously parallel conductors arranged at the same level one next to the other, with a transverse spacing which is in a range of 5 to 200% of the vertical height of the aerial crossed coils;

said plurality of conductors comprises one of an odd number of conductors and an even number of conductors;

adjacent conductors of said plurality of conductors carry oppositely phased alternating current flowing therein;

in the case of an odd number of conductors, conductors closer to a center of said plurality of conductors carry a larger current than conductors nearer to an edge of said plurality of conductors;

in the case of an even number of conductors, the aerial crossed coils are arranged on the vehicle at a point where, when said vehicle is in a desired transverse position, said aerial crossed coils are above a part of the alternating magnetic field formed between two conductors and are aligned with this part so that the horizontal component of the alternating magnetic field becomes null when the vehicle is in said desired transverse position relative to a center of the supporting surface;

in the case of an odd number of conductors, the aerial crossed coils are arranged on the vehicle at a point where, when said vehicle is in a desired transverse position, said aerial crossed coils are above a conductor located between two conductors, and are aligned with the alternating magnetic field in a position at which the vertical component of the alternating magnetic field becomes null when the vehicle is in said desired transverse position relative to a center of the supporting surface; and the guidance conductors have a transverse spacing substantially equal to an integral multiple of a transverse spacing of metal reinforcement elements in said vehicle supporting surface, with an accuracy of ±20%.

2. Guidance arrangement according to claim 1 wherein said transverse spacing of said plurality of conductors is within a range of 50 to 100% of said vertical height of the aerial crossed coils.

3. Guidance arrangement according to claim 1 wherein in the case of an even number of conductors, said aerial crossed coils are arranged on the vehicle at a point where, when the vehicle is at a desired transverse position, said aerial crossed coils are located above a part of the magnetic field formed between two central conductors of said plurality of conductors.

4. Guidance arrangement according to claim 1 wherein in the case of an odd number of conductors, said aerial crossed coils are arranged on the vehicle at a point where, when the vehicle is at a desired transverse position, said aerial crossed coils are located above a central conductor of said plurality of conductors.

5. Guidance arrangement according to claim 1 where said accuracy is ±10%.

6. Guidance arrangement according to claim 1 wherein the horizontal spacing of the conductors is in a range of approximately 2 to 80 cm.

7. Guidance arrangement according to claim 6 wherein said horizontal spacing of the conductors is within a range of 20 to 40 cm.

8. Guidance arrangement according to claim 1 wherein said vehicle supporting surface is made of metal-reinforced concrete, with metal reinforcement elements which extend in a longitudinal direction of the vehicle supporting surface and which have a constant transverse spacing along an entire longitudinal extent of the guidance conductors.

9. Guidance arrangement according to claim 1 wherein each of the conductors is contained in a groove in the vehicle supporting surface, said groove being transversely positioned as a function of locally occurring interference in the alternating magnetic field in a manner which compensates the magnetic field distortions caused by interference.

10. Guidance arrangement according to claim 1 wherein at least three conductors are laid in an area of the vehicle supporting surface, in which the alternating magnetic field is disturbed to a particularly high degree.

11. Guidance arrangement according to claim 1 wherein said plurality of conductors comprises at least three conductors arranged equidistantly with respect to one another.

12. Guidance arrangement according to claim 1 wherein said plurality of conductors comprises at least three conductors, and currents carried by the individual conductors are distributed approximately in the ratios according to the following pattern—progressively from one outermost conductor to an opposite outermost conductor:

| | |
|---|---|
| in the case of three conductors as | 1:2:1, |
| in the case of four conductors as | 1:3:3:1, |
| in the case of five conductors as | 1:4:6:4:1, |
| in the case of six conductors as | 1:5:10:10:5:1, |
| in the case of seven conductors as | 1:6:15:20:15:6:1, |
| in the case of eight conductors as | 1:7:21:35:35:21:7:1 or |
| in the case of nine conductors as | 1:8:28:56:70:56:28:8:1. |

\* \* \* \* \*